May 22, 1956      J. C. SMITH      2,746,634
SECTIONAL THERMOS FOOD CONTAINERS
Filed June 17, 1953
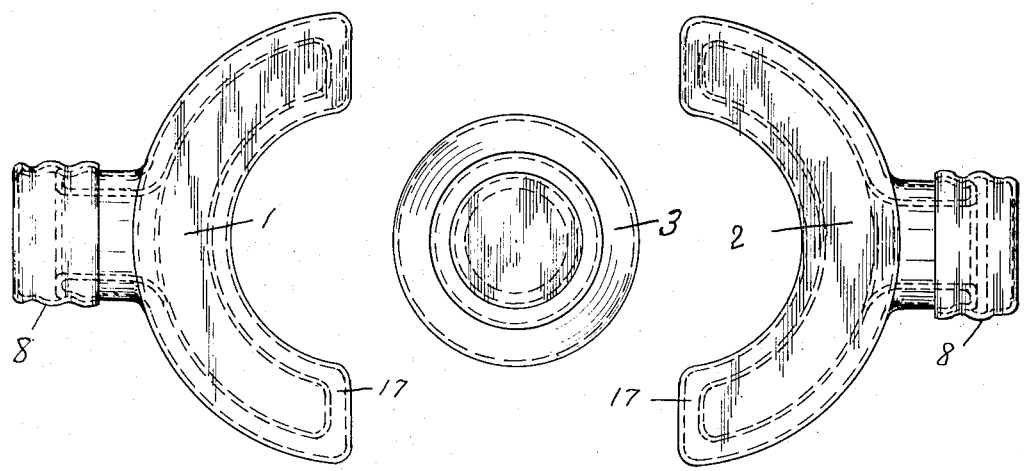
*Fig. 1.*     *Fig. 2.*     *Fig. 3.*
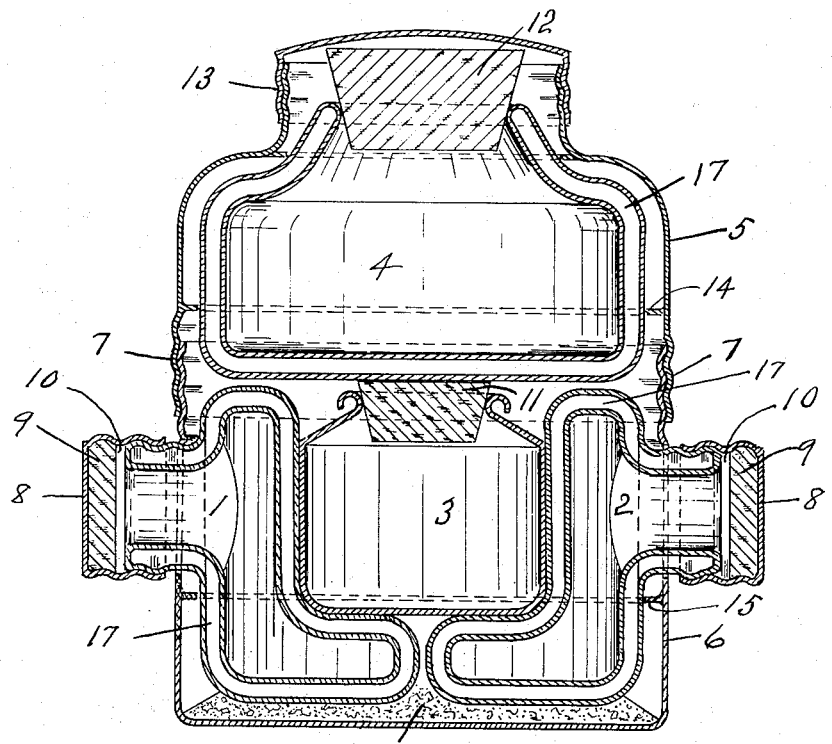
*Fig. 4.*
INVENTOR.
Joe Leigh Smith
BY Chas. Denegre
Attorney.

United States Patent Office 2,746,634
Patented May 22, 1956

2,746,634
SECTIONAL THERMOS FOOD CONTAINERS
Joe Ceifh Smith, West Blocton, Ala.
Application June 17, 1953, Serial No. 362,281
1 Claim. (Cl. 220—16)

This invention relates to a sectional Thermos food container. It has for its main objects to provide such a container that will be highly satisfactory for the purpose intended, simple in structure, comparatively cheap to manufacture, attractive in appearance, and extremely durable.

A further object is to provide such a container suitable for two or three liquids if desired and ample space for solid foods.

Other objects and advantages will appear from the drawing and specification.

By referring generally to the drawing, it will be observed that Fig. 1 is a plan view of one of the regular liquid containers; Fig. 2 is a plan view of the lower center container suitable for liquid or solid food; Fig. 3 is a plan view of another regular liquid container; and Fig. 4 is a verticle center sectional view of the assembled container showing four separate compartments.

Similar reference numerals refer to similar parts throughout the several views.

Referring to the drawing in detail it will be seen that the container has four compartments, 1 and 2 being for liquid only, 3 being for liquid or solid food, and 4 for solid food, which, however, may also be used for liquid. The case comprises two parts 5 and 6 screwed together as at 7. The regular liquid containers are provided with screw-type caps 8 with cork cushions 9 and gaskets 10 to make the containers leak-proof. Container 3 is provided with a cork 11 held in closed position by the bottom of container 4 which is also provided with a cork 12 held in closed position by a screw-type cap 13. The case is provided with integral flanges 14 and 15 for holding the compartments in their proper positions when assembled. A cushion element 16 such as a cork mat or felt is provided on the inner face of the bottom of the case as a shock absorber. The walls of the compartments 1, 2 and 4 are made with space 17 between them for vacuum.

From the foregoing it will appear that by removing the top cap and unscrewing the case at its center joint, all containing compartments may be removed and used separately. Also it will appear that by removing the caps from the liquid containers the contents may be poured out without disturbing the other assembled parts.

The various parts of the assembled containers and case may be made of any material suitable for the purpose. Also the parts may be made in different sizes and capacities, depending on how and where to be used.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A sectional Thermos food container of the character described comprising a main case in two parts with a screw-type connecting joint for removably holding the parts together, two liquid containing compartments mounted removably in the lower part of the said case, each liquid container having a neck providing an opening, and a removable cap thereon, said neck projecting through the side of the case, said caps being leak-proof when closed, a third container mounted in the lower part of the case and between the upper portions of said liquid containers, a cork closure in the top of said third container, a fourth container mounted in the upper portion with its bottom in contact with the cork closure of the third container, a cork closure in the top of the said fourth container, a screw-type cap on the top opening of the case with the inner face of the cap adjacent the cork closure thereunder, a cushion element on the inner face of the bottom of the case, the walls of the said liquid containers and the container in the upper portion of the case with space between the walls for vacuum.

References Cited in the file of this patent
UNITED STATES PATENTS

| | | |
|---|---|---|
| 485,098 | Forshew | Oct. 25, 1892 |
| 2,425,963 | Silva | Aug. 19, 1947 |
| 2,462,461 | Bird | Feb. 22, 1949 |
| 2,644,578 | Bramming | July 7, 1953 |